United States Patent [19]

Branca et al.

[11] Patent Number: 5,094,895
[45] Date of Patent: Mar. 10, 1992

[54] COMPOSITE, POROUS DIAPHRAGM

[76] Inventors: Phillip A. Branca, 132 Country Flower Rd., Newark, Del. 19711; Daniel E. Hubis, 227 Fair Hill Dr., Elkton, Md. 21921; Robert S. Mallouk, Box 332, R.D. #1, Chadds Ford, Pa. 19317; Randal L. Perry, 1006 Timberwyck Rd., Wilmington, Del. 19810

[21] Appl. No.: 511,110

[22] Filed: Apr. 19, 1990

Related U.S. Application Data

[63] Continuation-in-part of Ser. No. 344,707, Apr. 28, 1989, abandoned.

[51] Int. Cl.[5] .................. B32B 1/08; B32B 27/08
[52] U.S. Cl. ................... 428/36.91; 428/220; 428/308.4; 428/422
[58] Field of Search .......... 428/422, 34.9, 421, 428/308.4, 36.91; 204/296; 427/115

[56] References Cited

U.S. PATENT DOCUMENTS

| | | | |
|---|---|---|---|
| 3,770,567 | 11/1973 | Grot | 428/421 X |
| 3,953,566 | 4/1976 | Gore | 428/422 X |
| 4,112,149 | 9/1978 | Babinsky | 427/115 X |
| 4,399,183 | 8/1983 | Withers | 428/422 X |
| 4,432,860 | 2/1984 | Bachot et al. | 204/296 |
| 4,539,085 | 9/1985 | Bachot et al. | 204/296 X |
| 4,613,544 | 9/1986 | Burleigh | 428/422 X |
| 4,814,412 | 3/1989 | Crowther et al. | 428/308.4 |
| 4,877,661 | 10/1989 | House et al. | 428/422 X |
| 4,954,388 | 9/1990 | Mallouk et al. | 428/198 |

Primary Examiner—Thomas J. Herbert, Jr.
Attorney, Agent, or Firm—Morlenson & Uebler

[57] ABSTRACT

A composite, porous, liquid-permeable article is provided which is a multilayer structure of discrete, bonded layers of porous, expanded polytetrafluoroethylene (EPTFE), which composite has its interior and exterior surfaces coated with a perfluoro ion exchange polymer to render the composite hydrophilic so as to resist gas locking in aqueous media wherein a composite diaphragm made therefrom, may also contain a water-soluble surfactant to assist in initial water penetration into the pores of the composite whereby an improved electrolytic cell is provided having the composite diaphragm as the porous separator in the electrolysis of alkali halide solutions and wherein the diaphragm is also useful as an improved filter medium.

23 Claims, 3 Drawing Sheets

COMPOSITE, POROUS DIAPHRAGM

CROSS-REFERENCE TO RELATED APPLICATION

This application is a continuation-in-part of earlier filed application Ser. No. 07/344,707, filed Apr. 28, 1989, now abandoned.

BACKGROUND OF THE INVENTION

1. Field of the Invention

The invention relates to a porous, liquid-permeable composite article useful as a diaphragm for electrolysis or as a filtering medium.

2. Description of Related Art

In the electrolysis or electrosynthesis of chemical compounds, a porous diaphragm is often used to separate the anode and cathode compartments and the reaction products while permitting the flow of some liquid components from one compartment to another. For example, in the production of chlorine and sodium hydroxide from brine, the brine feed flows from the anode compartment through the porous diaphragm to the cathode compartment and then is discharged from the cell as illustrated in FIG. 1. Approximately half of the sodium chloride is converted to sodium hydroxide and chlorine in the process.

The effect of diaphragm structure on the performance of a chlor-alkali cell is quite complex. The diaphragm can be described in terms of pore size distribution, porosity, tortuosity, thickness and resultant permeability of the structure. For a given set of cell operating conditions, these parameters, and especially their uniformity across the active area of the diaphragm, determine the electrical energy usage of the cell. Lack of uniformity of flow rates across the surface of the diaphragm cause areas of low brine velocity, which allows hydroxyl ion back migration, leading to poor current efficiency. This effect can be ameliorated by using a thicker, less porous or more tortuous structure, leading however, to higher operating voltage and greater electrical energy usage. The art in designing a diaphragm for chlor-alkali production is to properly balance the diaphragm properties to minimize overall electrical energy usage by reducing operating voltage while maintaining high current efficiency. This is most effectively done with a diaphragm whose properties are highly uniform across its active area.

In the electrolysis of brine, the power consumption in terms of kilowatt hour (kWh) per metric ton of sodium hydroxide can be expressed by the following equation:

$$kWh/\text{metric ton NaOH} = \frac{67010 \times \text{cell voltage}}{\% \text{ caustic current efficiency}}$$

Obviously it is economically desirable to achieve as high a caustic current efficiency as possible and require as low a voltage as possible. A desirable diaphragm will have a low "k" factor, k being the slope of the voltage versus current density relationship. Many commercial diaphragm chlor-alkali cells operate at a maximum current density of either 2.3 kilo-amperes per square meter or 2.8 kilo-amperes per square meter.

A commonly used porous diaphragm is prepared from asbestos fiber by essentially a paper making process. Asbestos flock is slurried and deposited in place on a screen in the electrolyzer to form a relatively thick, stiff diaphragm which is held together by the hydroxide gels formed in the asbestos while in operation. The asbestos diaphragm has often been termed a "living diaphragm" in that it is constantly being changed by dissolution, erosion, redeposition and precipitation of silica and alkali earth hydroxides. Suspended particles and dissolved alkali earth metals redeposit preferentially in the higher flow regions allowing a leveling effect on permeability.

However, this "living" or reactive feature of the asbestos diaphragm can contribute to a relatively short life. Usually, within 6–12 months, sufficient chemicals are leached out of the asbestos and the uniformity and porosity are so degraded that current efficiency drops to unacceptable levels. For the same reason, electrical upsets or fluctuations in the system can result in a very rapid destruction of the asbestos diaphragm. Finally, the asbestos diaphragm has a relatively high k factor of about 0.55 volt square meter per kiloampere ($Vm^2/kA$) such that, for example, at 2.8 $kA/m^2$, the diaphragm typically requires 3.84 volts or more for operation, resulting in substantial power costs. For these reasons, the industry has sought more inert, more stable diaphragms, which can operate consistently at high current efficiency and at lower voltage and which will not be destroyed by power upsets, fluctuations or outages.

A number of modified asbestos diaphragms have been developed. U.S. Pat. No. 3,853,720 discloses a preparation of a diaphragm for chlor-alkali service involving asbestos fiber, a second fibrous material including polytetrafluoroethylene (PTFE) fiber, and an organic exchange resin. U.S. Pat. Nos. 4,170,537, 4,170,538 and U.S. Pat. No. 4,170,539 describe a diaphragm of an asbestos or polymer matrix containing inorganic zirconium or magnesium compounds and, in some cases, "Nafion ® 601 polymer solution", a colloidal dispersion of hydrolyzed perfluorosulfonic acid polymer, which is used to impregnate the structure. All of these structures rely, to some extent, on the asbestos or the added compounds which generate hydroxide gels to regulate porosity and uniformity. Accordingly, though somewhat more stable than unmodified asbestos, they suffer from the same deficiencies described for the asbestos diaphragm described above. These patents also mention expanded PTFE (EPTFE) as a possible polymer matrix but the pore size range specified, 0.8–50 microns, preferably 5–20 microns, is relatively large so that the permeability level is controlled by the hydroxide gels formed within the diaphragm.

A number of U.S. Patents, U.S. Pat. Nos. 3,930,979, 4,113,912, 4,224,130, 4,606,805, 4,385,150, 4,666,573, 4,680,101, 4,720,334 and 4,341,614, describe porous PTFE diaphragms made wettable by various means. U.S. Pat. Nos. 3,930,979, 4,250,002, 4,113,912, 4,385,150 and 4,341,614, describe porous PTFE diaphragms prepared by combining PTFE powder or fiber with a sacrificial filler. The mixture is formed into a sheet and the filler is removed by dissolving it or decomposing it with heat thus leaving the PTFE sheet porous. The homogeneity of the mixture and the particle size distributions of the filler and PTFE severely limit the uniformity possible in the finished diaphragm. Because a large percentage of the structure is removed to provide the necessary porosity, the finished diaphragm is inherently weak. To offset these uniformity and strength problems, the finished diaphragm must be very thick resulting in high operating voltage. A number of patents, including U.S.

Pat. Nos. 4,606,805, 4,666,573, 4,113,912, 4,680,101 and U.S. Pat. No. 4,720,334, describe porous PTFE diaphragms prepared by a PTFE fiber slurry deposition process. The size, shape and size distribution of the PTFE fiber available leads to a large pore, inherently weak, non-uniform structure which must be made very thick to provide utility. This trade-off results in high operating voltages. In addition, in U.S. Pat. Nos. 3,930,979, 4,113,912, 4,224,130, 4,250,002, 4,341,614 and 4,606,805, no perfluoro ion exchange polymer is involved so that an adequate level of hydrophilicity, which remains chemically stable in a hostile environment such as a chlor-alkali cell, is not achieved. When an adequate level of hydrophilicity is not maintained, gas bubbles generated at the cathode will accumulate in the diaphragm pores blocking both bulk and ion flow. This reduces the effective diaphragm area leading to an increase in operating voltage and eventually causing system shutdown. This is called "gas locking".

U.S. Pat. No. 3,944,477 describes a diaphragm of porous polytetrafluoroethylene sheet material with a microstructure characterized by nodes and fibrils and having a multilayer structure wherein a number of such films are bonded together. Initial wettability is achieved by treatment with acetone and water, with no mention made of organic surfactants. More importantly, there is no disclosure of impregnation with a perfluoro ion exchange polymer. While the diaphragms of the present invention have given satisfactory performance after as much as 421 days, the reference reports no extended runs.

U.S. Pat. Nos. 4,089,758 and 4,713,163 describe porous diaphragms involving EPTFE structures made hydrophilic with inorganic filler particles or organic surfactants. These diaphragms are susceptible to gas locking, which will block ion and bulk fluid flow, resulting in increasing operating voltage, decreasing current efficiency and ultimate system shutdown.

U.S. Pat. No. 3,940,916 describes a porous diaphragm made from a fabric spun from an ion exchange polymer. The pore size of this structure is too large for efficient operation in a chlor-alkali cell. Because of this, very thick structures are required for high current efficiency operation resulting in high voltage.

U.S. Pat. No. 4,385,150 discloses, but does not claim, a porous asbestos or PTFE substrate impregnated with an organic solution of a fluorinated copolymer having a carboxyl functional group. The disclosure does not specify the PTFE as having a microstructure characterized by a series of nodes interconnected by fibrils, nor does it specify a multilayer construction. Accordingly, this PTFE structure does not provide the uniformity of structure, porosity and permeability necessary for sustained high efficiency operation in a chlor-alkali cell.

U.S. Pat. Nos. 3,692,569, 4,453,991, 4,865,925 and 4,348,310 and Japanese Patent Applications JPA-61-246,394 and JPA-63-99,246 describe and claim porous diaphragms involving EPTFE coated with perfluoro ion exchange resin for use in electrochemical cells. However, the EPTFE cited is not a layered structure and will not, at a corresponding thickness, provide the small pore size and uniformity of structure necessary for efficient operation of a chlor-alkali cell, especially in thicknesses exceeding 20 mils. Moreover, U.S. Pat. Nos. 4,453,991 and 4,348,310 specify impregnation of the EPTFE with perfluoro ionomer solutions with equivalent weights exceeding 1000. The relatively large micelles of these high equivalent weight systems cannot penetrate a relatively thick, small pored EPTFE structure to uniformly and thoroughly impart sufficient hydrophilicity to the entire structure to allow efficient chlor-alkali diaphragm operation.

U.S. Pat. No. 4,865,925 discloses use of an EPTFE/-perfluoro ion exchange resin structure for a fuel cell, which is an electrochemical cell, but the structure would not be suitable for a diaphragm because it is porous to gas. A chlor-alkali cell requires that hydrogen from the cathode side must not mix with chlorine from the anode side because most hydrogen/chlorine mixtures are explosive. The reference makes no disclosure of the need for thorough impregnation, the need for at least four layers of EPTFE thermally bonded together, or the preference for certain equivalent weights for the ion exchange resin.

U.S. Pat. No. 4,277,429 describes a method for producing a porous PTFE that is asymmetric in the sense that there is a measurable difference in bubble point between one surface and the reverse side surface. Slightly different permeability to isopropanol is noted in one direction than in the reverse direction. Such a structure, however, is monolithic and not layered and would not provide the high level of uniformity of pore size and pore size distribution necessary for efficient operation of a chlor-alkali cell. In addition, the interior and exterior surfaces of this porous PTFE are hydrophobic and would "gas lock" in chlor-alkali production or in other electrolytic or filtration uses where gas entrainment is a potential problem.

International Patent Application No. PCT/US88/00237, publication number WO88/05687 and its counterpart U.S. Pat. No. 4,863,604, describes a microporous, asymmetric, integral, composite polyfluorocarbon membrane of two or more sheets of microporous fluorocarbon polymer having different average pore sizes. These structures, however, would not be useful as diaphragms in a chlor-alkali cell. Such sheets are not EPTFE structures but rather are prepared by incorporating a particulate, inorganic, solid, pore forming filler, removeable by leaching and heating, into the polytetrafluoroethylene polymer, and shaping the resultant mixture by preforming and calendering it into a self-sustaining sheet or film. The multilayer structure is assembled by starting with a sheet of PTFE/pore forming filler which has small pore forming filler particles. On top of this sheet are layered additional sheets of PTFE/pore forming filler which contain progressively larger pore forming filler particles. The sheets are bonded with heat and pressure, followed by sintering. Finally, the pore forming filler is removed by leaching or heat, thus leaving the multilayer PTFE sheet porous. As discussed above, the homogeneity of the mixture and the particle size distributions of the filler and PTFE severely limit the uniformity possible in microporous structures prepared by leaching or otherwise removing incorporated particles. This limitation is further compounded by the limitation on sharply fractionating particle sizes for the various layers of the asymmetric structure. Also, as mentioned above, because a large percentage of the structure is removed to provide the necessary porosity, the finished structure is inherently weak. To deal with these uniformity and strength problems, the finished diaphragm must be very thick, which is undesirable in electrolytic operations because of the high operating voltage required. In addition, in PCT/US88/00237 (WO88/05687) and in U.S. Pat. No. 4,863,604, no perfluoro ion exchange polymer is involved so that an adequate level of hydrophilicity which remains stable in a hostile environment is not achieved. As discussed above, when an adequate level of hydrophilicity is not maintained, "gas locking" occurs reducing effective diaphragm area leading to an increase in operating voltage.

U.S. Pat. No. 4,385,093 describes a porous PTFE article prepared by layering together PTFE components followed by expanding in one or more directions. The resulting article has very high interlayer bond strengths and appears uninterrupted at the layer interfaces. The interlayer bond strength of this article was shown to be much higher than a composite prepared by layering and sintering two already expanded PTFE sheets. The high interlayer bond strength is desirable in certain applications to prevent delamination of the layers due to gas, liquid or osmotic pressure which may build up inside the structure during use. The method of U.S. Pat. No. 4,385,093 does not take advantage of the averaging effect of layering because the expansion is carried out after the layering step. The resulting product is less uniform in structure and pore size than the article of this invention which is made by layering already expanded sheets. Further, the pure PTFE structure of U.S. Pat. No. 4,385,093 has an inherent tendency to entrain gas in certain aqueous, electrolytic or filtration applications and will eventually gas lock.

U.S. Pat. No. 4,341,615 and U.S. Pat. No. 4,410,638 both claim a wettable, microporous diaphragm for electrolysis having a base of fluorinated resin, the pores of the microporous diaphragm having deposited therein a copolymer of an unsaturated carboxylic acid and a nonionic unsaturated monomer. The structure is monolithic and not layered and does not provide the uniformity of structure necessary to provide high current efficiency and low operating voltage for chlor-alkali operation. This deficiency is further compounded in that this monolithic, fluorinated resin construction is prepared by leaching out calcium carbonate particulates from the fluorinated resin composite. Accordingly, as pointed out earlier, the homogeneity of the mixture and particle size distribution of the filler and resin severely limit the uniformity of structure possible in the microporous sheet. The copolymer deposited within the pores to impart hydrophilicity is not perfluorinated and does not provide the necessary durability in the corrosive environment of chlor-alkali service.

The present invention is a porous, multilayer construction comprising multiple layers of porous EPTFE bonded together wherein the internal and external surfaces are at least partially coated with a perfluoro ion exchange polymer. Two U.S. patent applications, U.S. Ser. No. 206,884 and U.S. Ser. No. 278,224 now U.S. Pat. No. 4,902,308 and U.S. Pat. No. 4,954,388 in the names of some of the inventors of the present invention, involve the same starting materials.

U.S. Ser. No. 206,884, "Composite Membrane" discloses a thin porous expanded PTFE whose internal and external surfaces are coated with a metal salt of a perfluoro ion exchange polymer. That composite is porous like the present invention but, in contrast to the present invention, it is much thinner. In that application, the perfluoro ion exchange polymer serves as an anchor for active metal ions which may scavenge, catalyze or otherwise react with fluids passing through the porous structure. The EPTFE component is a single layer construction, not the multilayer form of the present invention.

U.S. Ser. No. 278,224 is a multilayer composite comprising a reinforcing fabric bonded to an expanded PTFE film which is laminated to a continuous film of perfluoro ion exchange polymer. In contrast to the present invention, that construction is a non-porous composite where the EPTFE is used as an interlayer between the continuous film of perfluoro ion exchange polymer and a reinforcing fabric. In addition, the EPTFE component is a single layer, not the multilayer construction of the present invention.

The carboxylic polymers with which the present invention is concerned have a fluorocarbon backbone chain to which are attached the functional groups or pendant side chains which in turn carry the functional groups. When the polymer is in melt-fabricable form, the pendant side chains can contain, for example,

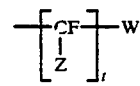

groups wherein Z is F or $CF_3$, t is 1 to 12, and W is —COOR or —CN, wherein R is lower alkyl. Preferably, the functional group in the side chains of the polymer will be present in terminal

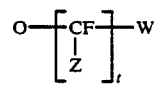

groups wherein t is 1 to 3.

The term "fluorinated polymer", used herein for carboxylic and for sulfonic polymers, means a polymer in which, after loss of any R group by hydrolysis to ion exchange form, the number of F atoms is at least 90% of the total number of F, H and Cl atoms in the polymer. For chloralkali cells, perfluorinated polymers are preferred, though the R in any COOR group need not be fluorinated because it is lost during hydrolysis.

Polymers containing

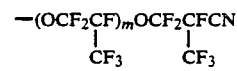

side chains, in which m is 0, 1, 2, 3 or 4, are disclosed in U.S. Pat. No. 3,852,326.

Polymers containing —$(CF_2)_p$COOR side chains, where p is 1 to 18, are disclosed in U.S. Pat. No. 3,506,635.

Polymers containing

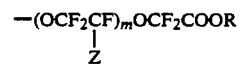

side chains, where Z and R have the meaning defined above and m is 0, 1, or 2 (preferably 1) are disclosed in U.S. Pat. No. 4,267,364.

Polymers containing terminal —$O(CF_2)_v$W groups, where W is defined above and v is from 2 to 12, are preferred. They are disclosed in U.S. Pat. Nos. 3,641,104, 4,178,218, 4,116,888, British Patent Nos. 2,053,902, EP No. 41737 and British Patent No. 1,518,387. These groups may be part of

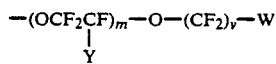

side chains, where Y=F, CF$_3$ or CF$_2$Cl. Especially preferred are polymers containing such side chains where v is 2, which are described in U.S. Pat. Nos. 4,138,426 and 4,487,668, and where v is 3, which are described in U.S. Pat. No. 4,065,366. Among these polymers, those with m=1 and Y=CF$_3$ are most preferred.

The above references describe how to make these polymers.

The sulfonyl polymers with which the present invention is concerned are fluorinated polymers with side chains containing the group

wherein R$_f$ is F, Cl, CF$_2$Cl or a C$_1$ to C$_{10}$ perfluoroalkyl radical, and X is F or Cl, preferably F. Ordinarily, the side chains will contain —OCF$_2$CF$_2$CF$_2$SO$_2$X or —OCF$_2$CF$_2$SO$_2$F groups, preferably the latter. For use in chloralkali membranes, perfluorinated polymers are preferred.

Polymers containing the side chain

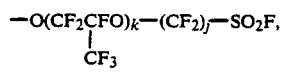

where k is 0 or 1 and j is 3, 4, or 5, may be used. These are described in British Patent No. 2,053,902.

Polymers containing the side chain —CF$_2$CF$_2$SO$_2$X are described in U.S. Pat. No. 3,718,627.

Preferred polymers contain the side chain

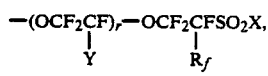

where R$_f$, Y and X are defined above and r is 1, 2, or 3, and are described in U.S. Pat. No. 3,282,875. Especially preferred are copolymers containing the side chain

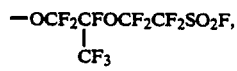

Polymerization can be carried out by the methods described in the above references. Especially useful is solution polymerization using ClF$_2$CCFCl$_2$ solvent and (CF$_3$CF$_2$COO)$_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

To make the lowest equivalent weight ion exchange polymers, copolymer in the melt-fabricable (for example, —SO$_2$F or —COOCH$_3$) form may be extracted as in U.S. Pat. No. 4,360,601 and the extracted polymer isolated for use in making the diaphragm. The extract has lower equivalent weight than the starting material.

The copolymers used herein should be of high enough molecular weight to produce films which are self-supporting in both the melt-fabricable precursor form and in the hydrolyzed ion-exchanged form.

SUMMARY OF THE INVENTION

A multilayer, porous, composite, shaped article is provided comprising multiple layers of porous, expanded polytetrafluoroethylene bonded together, the composite, shaped article having at least a portion of its exterior surfaces and at least a portion of its interior pore surfaces coated with a perfluoro ion exchange polymer. Preferably, the composite article has substantially all of its exterior surfaces and substantially all of its interior pore surfaces coated with a perfluoro ion exchange polymer. The composite article may contain a water soluble surfactant within its pores. The article may be in the form of a sheet or a tube. The perfluoro ion exchange polymer is a perfluorosulfonic acid polymer of equivalent weight less than 1000, a perfluorocarboxylic acid polymer of equivalent weight less than 1000, a mixture of perfluorosulfonic acid polymer and perfluorocarboxylic acid polymer of equivalent weight less than 1000, or a copolymer containing perfluorosulfonic acid and perfluorocarboxylic acid groups, with an equivalent weight less than 1000. The percentage by weight of perfluoro ion exchange polymer in the composite exceeds 2%. The sheets are relatively thick, having a thickness exceeding 0.25 millimeters, preferably between about 0.76 millimeters and about 5.0 millimeters. The composite article has a permeability to water containing 0.1% tetra ethyl ammonium perfluorooctane sulfonate between about 0.01 and about 3.0 reciprocal hours at 23° C. under a 20 cm head of water and a specific gravity between about 0.05 and about 1.1, preferably between about 0.15 and about 0.7. The composite article may have an asymmetric fine structure, wherein at least two of the layers have different microporous structures. The two or more layers may have methanol bubble point values which differ by at least 10% or have specific gravities which differ by at least 5%.

In an electrolytic cell containing anode and cathode compartments separated by a diaphragm, an improved diaphragm is provided comprising a multilayer, porous composite diaphragm of multiple layers of porous, expanded polytetrafluoroethylene bonded together, the composite diaphragm having at least a portion of its exterior surfaces and at least a portion of its interior pore surfaces coated with a perfluoro ion exchange polymer. A plurality of composite diaphragms may be used to separate a plurality of cell compartments of an electrolytic cell. The composite diaphragm preferably has substantially all of its exterior surfaces and substantially all of its interior pore surfaces coated with a perfluoro ion exchange polymer. The diaphragm may initially contain water soluble surfactant within its pores to enhance initial wetting. The diaphragm may have an asymmetric fine structure, wherein at least two of the multiple layers have different microporous structures, wherein the two or more layers have specific gravities which differ by at least 5%. The asymmetric diaphragm preferably is oriented such that, in the two or more layers, the layer of lower specific gravity is closer to the anode side of the cell and the layer of higher specific gravity is closer to the cathode side of the cell.

The multilayer EPTFE structure of this invention yields an exceptional level of uniformity in diaphragms such that they operate at cell voltages and current efficiencies significantly better than those of prior art. The perfluoro ion exchange coating on the interior and exterior surfaces of the diaphragm, the other essential feature of this invention, provides a level of hydrophilicity that prevents gas locking and leads to sustained operation at high current efficiency and low voltage.

An improved filter medium is also provided comprising a multilayer, porous, composite, shaped article of multiple layers of porous, expanded polytetrafluoroethylene bonded together, the composite having at least a portion of its exterior surfaces and at least a portion of its interior pore surfaces coated with a perfluoro ion exchange polymer. The filter medium may be in the form of a sheet or a tube.

Another aspect of the present invention is a process for coating the exterior surfaces and at least a portion of its interior pore surfaces with a perfluoro ion exchange polymer. One feature of this process is the incorporation in the liquid coating composition of an organic compound which enables the composition to fully wet a horizontal surface of nonporous PTFE (as distinguished from expanded PTFE) and to remain spread out as the composition dries instead of forming droplets. Another feature of the present invention is the use of vacuum to remove most of the air from the EPTFE before the coating composition is introduced from one side of the EPTFE.

Figure 1:
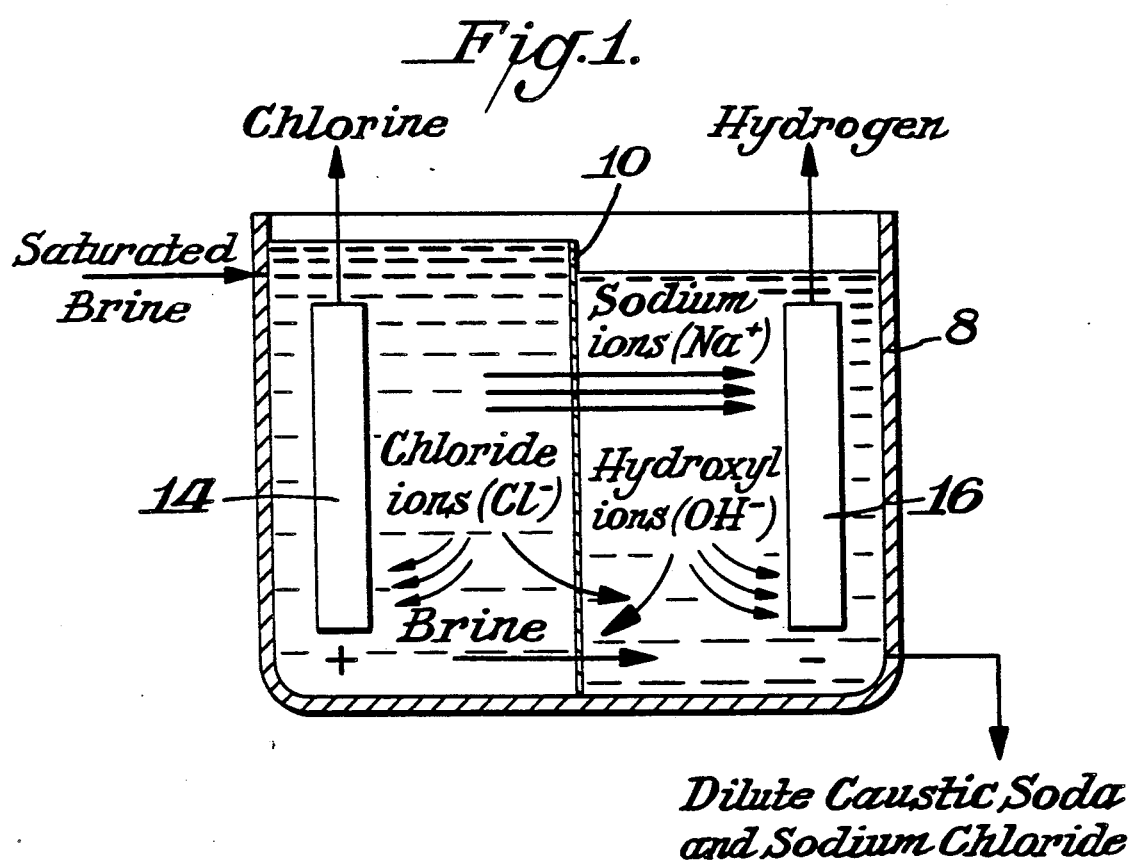
FIG. 1 is a schematic diagram of an electrochemical cell.

DETAILED DESCRIPTION OF THE INVENTION AND PREFERRED EMBODIMENTS WITH REFERENCE TO THE DRAWINGS

A composite, porous, liquid-permeable article is provided which is a multilayer structure of discrete, bonded layers of porous, expanded polytetrafluoroethylene (EPTFE). The composite has its interior and exterior surfaces coated with a perfluoro ion exchange polymer to render the composite hydrophilic so as to resist gas locking in aqueous media. Initially, the diaphragm may also contain a water soluble surfactant to assist in initial water penetration into the pores of the composite. An improved electrolytic cell is provided having the composite diaphragm as the porous separator in electrolysis processes, particularly electrolysis of alkali halide solutions. The diaphragm is also useful as an improved filter medium.

More specifically, a mechanically strong, porous, composite, liquid-permeable diaphragm is provided which is a multilayer structure of discrete bonded EPTFE layers. This relatively thick, preferably greater than 5 mil thick, layered structure provides a small pore size and uniformity of structure not attainable in monolithic EPTFE structures. By coating the interior and exterior surfaces of this structure with a perfluoro ion exchange resin of equivalent weight less than 1000, hydrophilicity of the resulting composite can be greatly increased, thereby drastically reducing the composite's tendency to entrain gas in the pores. Initial wetting is assured by initially incorporating a water soluble surfactant in the pores when desirable.

In the electrolysis of brine, the porous composite of this invention provides a chemically stable, porous diaphragm with a uniform microstructure such that uniformity of flow and high current efficiency can be obtained without the reactive hydroxide gel deposits encountered with conventional diaphragms. Further, the porous composite of this invention can withstand numerous electrical upsets, shutdowns or fluctuations encountered in normal cell room operations without significant loss of performance. The porous multilayer composite of this invention also provides a small pore size and uniformity of structure and flow not obtainable in the thick, monolithic EPTFE structures or in the PTFE structures prepared by slurry deposition of fibers or by leaching soluble particulates from a filled PTFE sheet.

The perfluoro ion exchange polymer is a copolymer of tetrafluoroethylene with one of the functional comonomers disclosed herein. The ratio of tetrafluoroethylene to functional comonomer on a mole basis is 1.5 to 5.6:1. For each comonomer, the most preferred ratio of tetrafluoroethylene to functional comonomer is determined by experiment.

Through the use of liquid compositions of perfluoro ion exchange resin of equivalent weight less than 1,000 and by virtue of the much smaller micelle dimensions of these dispersions as compared to dispersions from perfluoro ion exchange resins with equivalent weight exceeding 1,000, the very small pores of the relatively thick multilayered structures of this invention can be penetrated and the exterior surfaces and interior pore surfaces can be uniformly coated with perfluoro ion exchange resin. A water soluble surfactant can also be introduced to facilitate initial wetting by aqueous media. For best performance, any surfactant present must be washed away before electrolysis is started. The perfluoro ion exchange resin, however, will not wash away nor will it be chemically degraded by the corrosive liquors of a chlor-alkali cell. It remains, coating the pores, and imparting a level of hydrophilicity such that gas generated in the electrolytic process will not displace electrolyte in the pores of the diaphragm. This remedies a deficiency of porous PTFE diaphragms of prior art where dewet or "gas locked" areas with blocked electrolyte flow often cause voltage rise and ultimate shutdown. The porous PTFE diaphragms of the prior art do not involve a chemically inert polymer to impart hydrophilicity or, if they do, they employ a higher equivalent weight polymer which, because of micelle size, cannot penetrate to uniformly coat the interior surfaces of very small pores in the multilayer EPTFE composite of this invention.

It has been found that a representative k factor obtained with the porous composite of this invention is about 0.32 $Vm^2/kA$. This results in considerable power savings over the 0.55 $Vm^2/kA$ k factor of asbestos or the 0.48 $Vm^2/kA$ k factor of modified asbestos diaphragms in current use.

By the layered approach, with proper selection of the EPTFE component layers, coupled with coating the interior and exterior surfaces of the multilayered article with a perfluoro ion exchange resin, an asymmetric structure that will operate well as an electrolytic separator or filtration medium can be created.

As used in this application, the term "asymmetric structure" means a multilayered, composite structure in which at least two of the multiple layers have different microporous structures, i.e., at least two of the layers in the composite have specific gravities which differ by at least 5%.

Such an asymmetric structure has utility as a diaphragm in a chlor-alkali cell. The preferred method of use is to orient the diaphragm such that the larger pore size, as indicated by a lower methanol bubble point (ASTM F316-80), faces the anode compartment. In this mode, a higher current efficiency is achieved. This is probably because the linear velocity of the electrolyte, in the direction of the cathode, increases as the electrolyte moves through the diaphragm and its effect on counteracting the back migration of the hydroxyl ion is correspondingly enhanced.

A detailed description of the invention and preferred embodiments is best provided with reference to the drawings and the examples which follow.

Figure 2:
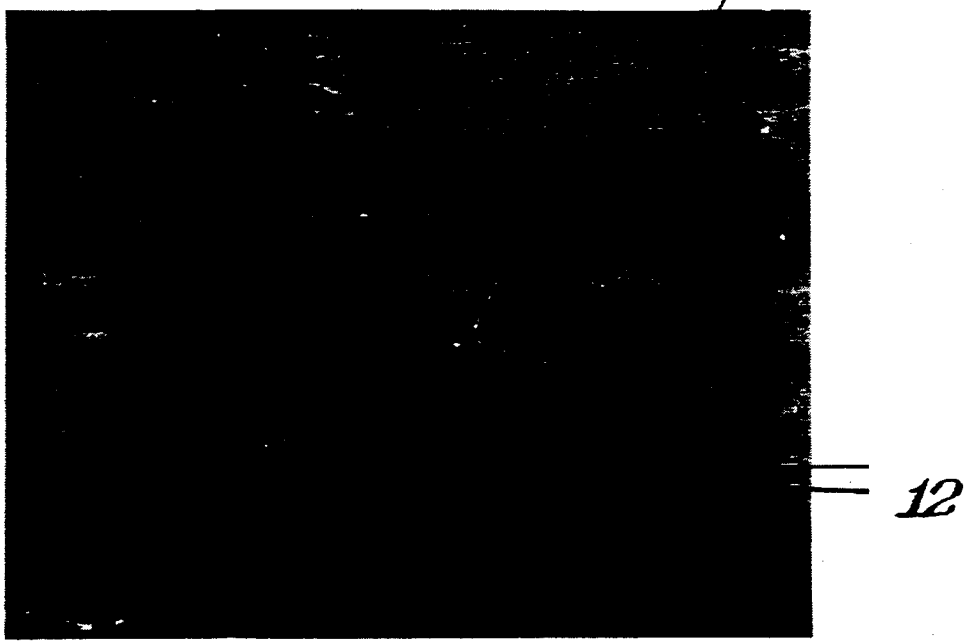
FIG. 2 is a photomicrograph taken at 45× magnification of the cross-section of a symmetric composite according to the invention.
Figure 3:
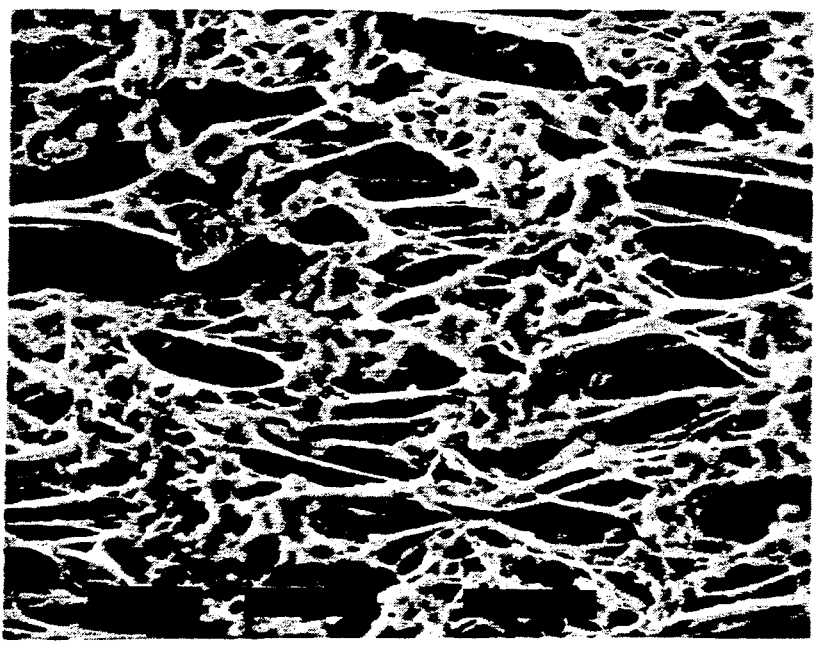
FIG. 3 is a photomicrograph taken at 5000× magnification of the symmetric composite and shows the microstructure of nodes and fibrils coated with a perfluoro ion exchange resin.

FIG. 1 is a schematic diagram of a chlor-alkali cell 8 containing anode 14 and cathode 16 in operation. A multilayered composite according to the invention and useful as the diaphragm 10 in such a cell is shown. FIG. 2 is a photomicrograph taken at 45× magnification of a cross-section taken in the thickness or Z-direction through the multilayered sheet 10. The individual layers 12 which make up sheet 10 are discernible. FIG. 3 is a photomicrograph taken at 5000× magnification of the sheet 10 shown in FIG. 2. Therein the microstructure of nodes and fibrils coated with a perfluoro ion exchange resin is shown.

Figure 4:
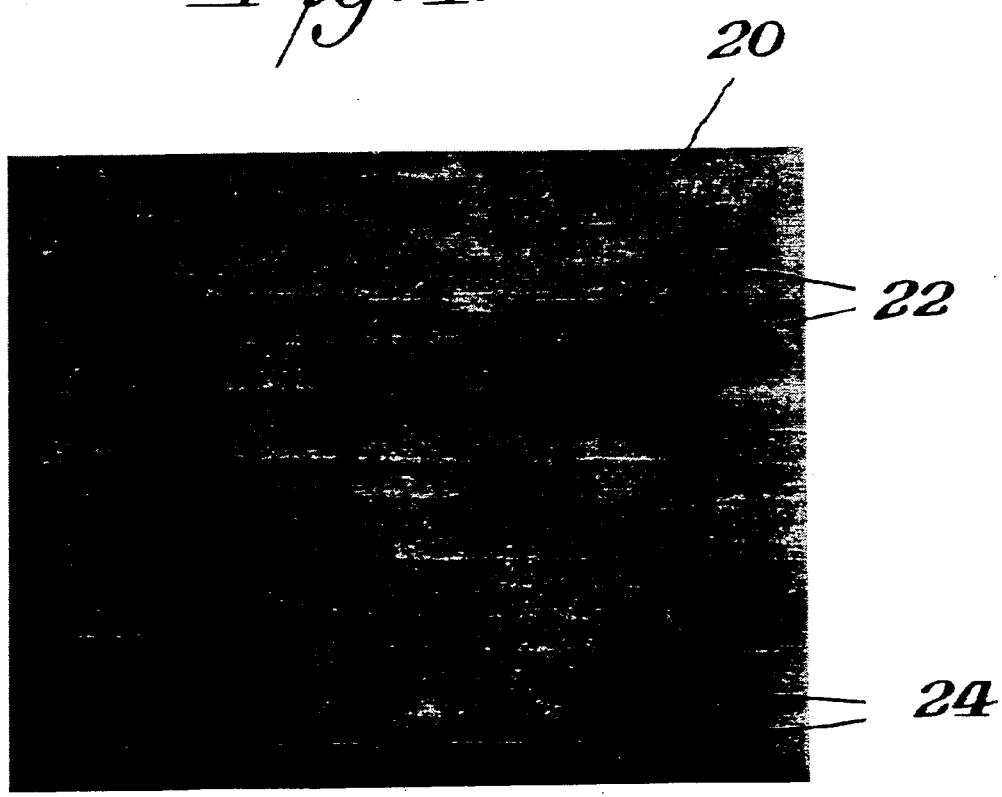
FIG. 4 is a photomicrograph take at 50× magnification of the cross-section of an asymmetric composite according to the invention.
Figure 5:
FIG. 5 is a photomicrograph taken at 5000× magnification of the asymmetric composite and shows the microstructure of nodes and fibrils coated with a perfluoro ion exchange resin.

FIGS. 4 and 5 are photomicrographs taken at 50× and 5000×, respectively, of an asymmetric sheet according to the invention. The overall sheet 20 is seen in FIG. 4 to be made up of thick layers 22 and relatively thinner layers 24. Layers 24 have a lower specific gravity than layers 22. The coated microstructure of this composite is shown in FIG. 5 which was taken at 5000× magnification.

The examples which follow are intended to be illustrative of the invention but not limitative in any way.

Attempts to duplicate the 95-95% current efficiency experiments were successful, but in some cases wherein membrane thickness was less than 90 mils, they gave a current efficiency as much as 4% lower.

In general, in order to make the composite articles of the invention, expanded PTFE sheeting having a microstructure characterized by a series of nodes interconnected by fibrils and having a Gurley air flow of 0.8 sec. to 27 sec., thickness between 0.2 mil and 10 mil, methanol bubble point (ASTM F316-80) between 0.7 psi and 40 psi, is wound around a cylindrical mandrel.

The EPTFE sheet suitably has a thickness of 25-125 micrometers, or 1.0-5.0 mils.

The length and diameter of the mandrel can be varied to give the desired dimensions for the finished sheet. Multiple layers, greater than 4, are wound onto the mandrel and the number of layers is varied to give the desired thickness and uniformity. The membrane is restrained at the ends of the mandrel by mechanical clamps or bands.

The layers of EPTFE sheeting are bonded together by immersion in a molten salt bath at a temperature above the cystalline melt point of EPTFE. The layered EPTFE composite is allowed to cool slowly on the mandrel in air. The layered composite is cut and removed from the mandrel to yield a flat sheet.

Impregnation of the layered flat sheet is carried out by using an alcohol based liquid composition of perfluorosulfonic acid ion exchange polymer. Polymer solids loading in the liquid composition can range from 0.5% up to 10%. Up to 8% surfactant or surfactant blend can be included to aid in distribution of the ion exchange polymer and in initial water wetting of the finished product. The layered flat sheet is fully wet with impregnating liquid composition. The impregnant is introduced from one side so as to avoid trapping air inside the structure.

Another feature of the preferred coating process is to evacuate most of the air from the EPTFE before the liquid composition is added to just one surface of the EPTFE. A suitable vacuum is an absolute pressure of 125 mm Hg, but the absolute pressure is not critical. It is believed that this feature means that the liquid composition moves in just one direction through the EPTFE and it encounters less air which could form air bubbles during the coating process and thus prevent coating of local areas of the EPTFE.

The liquid composition used to coat the exterior surfaces and at least a portion of its interior pore surfaces with a perfluoro ion exchange polymer preferably contains an organic compound or compounds that enable the composition to fully wet the surface of a full density EPTFE upon which it is poured. The compound shall be soluble in water and compatible with the solvents used in the liquid composition. The compound shall wet EPTFE and the perfluoro ion exchange polymer, and shall have a boiling point above the boiling point of water but below the decomposition temperature of the perfluoro ion exchange polymer. This combination of properties enables the liquid composition to spread evenly and uniformly over the external surfaces and internal pore surfaces of the EPTFE and to dry without drawing up into discrete droplets which would contribute to non-uniform coating of the EPTFE with ion exchange resin. A suitable organic compound is 1-methoxy-2-propanol.

Excess impregnating liquid is removed from the outside of the sheeting by wiping or squeegeeing. The wet sheet is then restrained at its edges to prevent shrinkage as the sheet is dried.

Drying can be carried out in air at temperatures ranging from 15° C. to 120° C. The preferred drying conditions are in air at 23° C. A post drying bake can be carried out at temperatures between 30° C. and 150° C.

EXAMPLE 1

Two relatively thick multilayer EPTFE composites were prepared by different methods. The first was prepared by layering nine full density, extruded PTFE tapes and biaxially expanding and sintering this composite according was to the disclosure of U.S. Pat. No. 4,187,390. The second composite was prepared by winding multiple layers of biaxially expanded, sintered PTFE sheeting onto a 3½ inch diameter aluminum mandrel and sintering these layers together by immersion in a molten salt solution for one minute at 370° C. The first sample will be referred to as "layered before expansion composite" and the second will be referred to as "layered after expansion composite", the latter being the precursor of the composite of this invention.

Specimens were cut from both of these composites and a specimen was cut from the single biaxially expanded sheet which was used to make the layered after expansion composite. Specimen size was chosen for each type of sheeting to give approximately the same total weight per specimen. The biaxially expanded PTFE sheeting specimens were cut so as to produce 12"×12" squares, the layered before expansion composite specimens were cut to yield 4½"×4½" squares and the layered after expansion specimens were cut to yield 3¼"×3¼" squares. A group of six specimens was taken from at least two different areas of the bulk sheet of each sample type to illustrate across-the-web variation.

Testing was carried out to determine the uniformity of each type of sheeting with respect to a number of physical characteristics. Each specimen was weighed to ±0.002 g accuracy, thickness was measured with a snap gauge, and air flow permeability was measured using a Gurley Densometer according to ASTM D726-58. Thickness and air flow measurements were taken in at least four areas of each specimen. Density values were calculated from weight and thickness data. Results of this testing can be seen in Table 1.

Range is defined as the difference between the high and low individual values for a set of data. The percent range is the range value divided by the average and is a measure of the full scope of values normalized to an average value of one. Similarly, percent standard deviation is the standard deviation for a set of data divided by the average and is a measure of the scatter of data normalized to an average value of one. These values are normalized measures of uniformity for a given physical property.

Normalizing the range and standard deviation values enables a comparison of the levels of uniformity of the different films with respect to each physical property examined.

Referring to Table 1, percent range and percent standard deviation values for the layered after expansion composite were lower than the layered before expansion composite and the biaxially expanded single layer film in thickness, density and air flow measurements. This demonstrates that the technique of layering an expanded PTFE sheet to form a thick composite, surprisingly and unexpectedly, gives a much more uniform structure than a thick sheet prepared by layering full density PTFE tapes and then expanding. The data above demonstrates that by layering expanded PTFE sheeting, variations in the sheet are averaged, giving a much more uniform layered composite than the original single layered sheet.

TABLE 1

|  | Biaxially Expanded PTFE | Layered Before Expansion Composite | Layered After Expansion Composite |
| --- | --- | --- | --- |
| Thickness Average | 3.53 | 39.3 | 69.7 |
| High | 4.05 | 47.0 | 72.5 |
| Low | 3.00 | 23.0 | 66.7 |
| Std. Dev. | 0.223 | 4.65 | 1.91 |
| Std. Dev. % | 6.3 | 11.8 | 2.7 |
| Range | 1.05 | 24.0 | 5.8 |
| Range % | 29.7 | 61.1 | 8.3 |
| Density Average | 0.290 | 0.264 | 0.302 |
| High | 0.308 | 0.293 | 0.309 |
| Low | 0.275 | 0.248 | 0.294 |
| Std. Dev. | 0.010 | 0.011 | 0.005 |
| Std. Dev. % | 3.3 | 4.3 | 1.5 |
| Range | 0.033 | 0.045 | 0.015 |
| Range % | 11.4 | 17.0 | 5.0 |

TABLE 1-continued

|  | Biaxially Expanded PTFE | Layered Before Expansion Composite | Layered After Expansion Composite |
| --- | --- | --- | --- |
| Gurley Air Flow Average | 9.7 | 68.8 | 94.6 |
| High | 12.3 | 82.6 | 97.5 |
| Low | 7.5 | 56.2 | 90.4 |
| Std. Dev. | 1.1 | 5.6 | 1.9 |
| Std. Dev. % | 11.2 | 8.1 | 2.0 |
| Range | 4.7 | 26.4 | 7.1 |
| Range % | 48.9 | 38.4 | 7.5 |

EXAMPLE 2

A section of expanded PTFE sheeting having an average methanol bubble point of 11.8 psi (ASTM F316-80), an air flow of approximately 5.1 seconds as measured by Gurley Densometer (ASTM D726-58) and thickness of approximately 4.4 mil was wound onto an aluminum mandrel (3.5" o.d. and 9" in length). A total of twenty (20) layers of EPTFE sheeting were wound onto the mandrel. This sheeting was restrained by placing hose clamps around the circumference of the mandrel at each end. The layers of EPTFE sheet were bound together by immersing the wound mandrel in a molten salt bath at 370° C. for one minute. The EPTFE wound mandrel was then allowed to cool slowly in room temperature air.

The layered EPTFE was cut along the length of the mandrel and removed to form a flat sheet. A section of this layered EPTFE sheet was impregnated with a liquid composition comprising 3.2% perfluorosulfonic acid polymer (equivalent weight 920 to 950) derived from a precursor copolymer of tetrafluoroethylene and

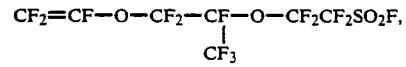

1.2% Triton X-100 non-ionic surfactant (Rohm and Haas) and 0.4% Triton CF-54 non-ionic surfactant (Rohm and Haas) in ethyl alcohol. The wet layered EPTFE structure was restrained to prevent shrinkage and was allowed to dry at approximately 23° C. overnight.

The resulting composite diaphragm contained 9.0% perfluoro sulfonic acid polymer by weight.

The EPTFE/perfluoro ion exchange polymer composite was wet with a 0.1% tetraethylammonium perfluorooctane sulfonate solution in water to facilitate start up.

The sample described above was tested in a laboratory scale cell consisting of a glass anode compartment separated from an acrylic cathode compartment by the diaphragm. The diaphragm was sealed in place using EPDM gaskets. The anode compartment consisted of an anolyte chamber containing about 500 milliliters of anolyte, a DSA ® anode obtained from Oxytech, Inc., a cell heater for temperature control, a brine feed line and a vertical tube connected to a chlorine outlet. This tube allowed disengagement of the chlorine and allowed an anolyte head of up to about 80 cm to be formed before overflow of the anolyte occured. The cathode compartment included a heavy gauge mild steel wire screen (of a type used in commercial diaphragm cells) tack-welded to a mild steel current distributor, a hydrogen disengagement area and a catholyte discharge. The cell had an active diaphragm area of 45 square centimeters, was controlled at a temperature of about 85° C., and was operated at a current of 11.25 amperes, resulting in a current density of 2.5 kiloamperes/square meter or 232 amperes/square foot.

Cell voltages were measured between points near the entrances of the electrodes into the cell bodies, and current efficiencies were calculated from the ratio of caustic produced over a sixteen hour period (from the total sample weight and titration to determine caustic concentration) to the number of coulombs supplied to the cell during this time. Electrical energy consumption of the cell is reported in kilowatt-hours per metric ton of caustic produced, which is calculated from the cell voltage and caustic current efficiency (CE) by the following equation:

Electrical Energy Consumption = 67010 × (cell voltage)/(CE)

in which the cell voltage is in volts and caustic current efficiency (CE) in percentage rather than fractional units. Another important parameter reported is k factor, which is the slope of the cell voltage versus the current density at current densities greater than one kiloampere per square meter. This normalizes data taken at different current densities, because voltage is linear with current density for all practical current densities above one kiloampere per square meter. For simplicity, the k factor was estimated by the following correlation:

k factor = (cell voltage − 2.3 volts)/(current density)

in which the cell voltage is measured in volts and the current density in kiloamperes per square meter. For samples operated at different current densities, the intercept was found to always be slightly greater than 2.3 volts, implying that this estimate of k factor gives an upper limit to the true value of the slope.

Typical operating conditions include an exit caustic concentration of approximately 10% and salt conversion of 52-55%. Brine was fed into the cells at a rate that was controlled to produce nominally 10% (by weight) caustic in the catholyte. Two kinds of brine were used in the tests: membrane quality brine, in which calcium and magnesium levels were kept below 50 ppb total, and diaphragm quality brine, in which the total calcium and magnesium were maintained between 0.9 and 1.8 ppm. The diaphragm quality brine came from two sources: spiking the membrane quality brine with calcium and magnesium salts, and filtered brine from an operating asbestos diaphragm plant.

The sample diaphragm described above was installed in a laboratory cell while wet with the water/surfactant solution. Membrane quality brine was allowed to flow through the diaphragm overnight without applied current. The sample was removed from the cell for several hours for cell modifications, then replaced and the brine feed restored. After a total of three days from the initial installation, a current of 11.25 amperes was applied. For the first thirty days of operation, the average cell voltage was 3.12 volts and caustic current efficiency was 95.4%, while the cell produced 10.0% caustic. Over the next thirty days of operation, the cell voltage averaged 3.07 volts and the current efficiency was 95.8% at an average of 10.2% caustic production. For days 61 to 132, the average cell voltage was 3.14 volts and current efficiency was 95.6% while producing an average of 10.2% caustic. At this time, the cell cracked and the anolyte compartment drained. Less than one-third of the diaphragm remained in contact with the electrolytes. The diaphragm was removed, placed in a mixture of brine and surfactant, then installed in a new cell after about a one-week delay. The diaphragm was operated in the new cell for an additional 60 days with an average cell voltage of 3.18 volts, an average current efficiency of 95.7% and an average caustic concentration of 10.1%. These data are summarized with power consumptions and k factors in Table 2. After the cell hydraulics stabilized, the daily anolyte head measurements averaged 23 centimeters with a standard deviation of 3.3 centimeters.

TABLE 2

| Days | Caustic wt. % | CE % | Cell Volts | kWh/ MT NaOH | k factor V/(kA/m$^2$) |
|---|---|---|---|---|---|
| 0-30 | 10.0 | 95.4 | 3.12 | 2190 | 0.33 |
| 31-60 | 10.2 | 95.8 | 3.07 | 2150 | 0.31 |
| 61-132 | 10.2 | 95.6 | 3.14 | 2200 | 0.34 |
| 142-201 | 10.1 | 95.7 | 3.18 | 2230 | 0.35 |
| Avg. | 10.1 | 95.6 | 3.13 | 2190 | 0.33 |

EXAMPLE 3 (COMPARATIVE)

A long section of expanded PTFE sheeting, the same as in Example 2, with an average methanol bubble point of 11.8 psi (ASTM F316-80), an air flow of approximately 5.1 second as measured by Gurley Densometer (ASTM D726-58) and thickness of approximately 4.4 mil was wound onto an aluminum mandrel (3¼" o.d. and 9" in length). A total of 20 layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 370° C. for one minute. The EPTFE wound mandrel was then allowed to cool slowly in room temeprature air.

The layered EPTFE was cut along the length of the mandrel and removed to form a flat sheet. A section of this layered EPTFE sheet was wet with isopropyl alcohol and placed in a permeability testing apparatus. The high head chamber of the cell was quickly filled with 0.1% tetraethylammonium perfluorooctane sulfonate in water and this solution was allowed to flow through the sample and displace the isopropyl alcohol. After the sample was fully wet with solution, permeability was measured.

The resulting diaphragm was 70 mils thick, had a Gurley air flow of 66 sec. and a permeability of 0.412 reciprocal hours to 0.1% tetraethylammonium perfluorooctane sulfonate in water when measured at 23° C. and at a 20 cm head height differential. This diaphragm sample contained no perfluoro ion exchange polymer.

The diaphragm was installed in a laboratory cell while wet with the surfactant/water solution and tested as described in Example 2. Membrane quality brine was allowed to flow through the diaphragm overnight without applied current. The current was started and increased to 11.25 ampere over a ten-minute period. The initial cell voltage at full current was 3.12 volts. After one day on load, the cell was producing 10.0% caustic at 2.76 volts with a current efficiency of 86.5%. After two days, the cell was producing 11.0% caustic at 3.48 volts with a current efficiency of 94.0%. The cell voltage increased above the equipment limits (about 10-15 volts) over the next 8 hours, causing the current to be interrupted. The cell could not be restarted without exceeding the equipment's voltage capacity.

EXAMPLE 4

A section of expanded PTFE sheeting with an average methanol bubble point of 11.8 psi (ASTM F316-80), an air flow of approximately 5.1 seconds as measured by Gurley Densometer (ASTM D726-58) and thickness of approximately 4.4 mil was wound onto an aluminum mandrel (6" o.d. and 9" in length). A total of twenty layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 370° C. for one minute. The EPTFE wound mandrel was then allowed to cool slowly in room temperature air.

The layered EPTFE was cut along the length of the mandrel and removed to form a flat sheet. A section of this layered EPTFE sheet was impregnated with a liquid composition comprising 3.2% perfluoro sulfonic acid polymer (equivalent weight 920 to 950), as in Example 2, 1.2% Triton X-100 non-ionic surfactant (Rohm and Haas), 0.4% Triton CF-54 non-ionic surfactant (Rohm and Haas) and 0.6% tetraethylammonium perfluorooctane sulfonate in ethyl alcohol. The wet layered EPTFE structure was restrained to prevent shrinkage and was allowed to dry at approximately 23° C. overnight.

The EPTFE/perfluoro ion exchange polymer composite was wet with a 0.1% tetraethylammonium perfluorooctane sulfonate solution in water to evaluate liquid permeability.

The resulting composite diaphragm contained approximately 5.5% perfluoro sulfonic acid polymer by weight and had a permeability of 0.085 reciprocal hours to 0.1% tetraethylammonium perfluorooctane sulfonate in water when measured at 23° C. and at a 20 cm head height differential.

The diaphragm was installed in a laboratory cell while wet with the surfactant/water solution and tested as described in Example 2. Membrane quality brine was allowed to flow through the diaphragm without applied current overnight. The current was started and increased to 11.25 amperes over a five-minute period. The initial cell voltage at full current was 2.76 volts. After five days on load, the cell was producing a 9.6% caustic at 2.99 volts with a current efficiency at 90.2%. The anolyte head was 57 centimeters. The cell test was then terminated.

EXAMPLE 5 (COMPARATIVE)

A section of expanded PTFE sheeting, the same as in Example 4, with an average methanol bubble point of 11.8 psi (ASTM F316-80), an air flow of approximately 5.1 seconds as measured by Gurley Densometer (ASTM D726-58) and thickness of approximately 4.4 mil was wound onto an aluminum mandrel (6" o.d. and 9" in length). A total of twenty layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 370° C. for one minute. The EPTFE wound mandrel was then allowed to cool slowly in room temperature air.

The layered EPTFE was cut along the length of the mandrel and removed to form a flat sheet. A section of this layered EPTFE sheet was wet with isopropyl alcohol and placed in a permeability apparatus. The high head chamber of the cell was quickly filled with 0.1% tetraethylammonium perfluorooctane sulfonate in water and this solution was allowed to flow through the sample and displace the isopropyl alcohol. After the sample was fully wet with solution, permeability was measured.

The resulting diaphragm was 65 mils thick, had a Gurley air flow of 97 sec. and a permeability of 0.448 reciprocal hours to 0.1% tetraethylammonium perfluorooctane sulfonate in water when measured at 23° C. and at a 20 cm head height differential. This diaphragm sample contained no perfluoro ion exchange polymer.

The diaphragm was installed in a laboratory cell while wet with the surfactant/water solution and tested as described in Example 2. Membrane quality brine was allowed to flow through the diaphragm overnight without applied current. The current was started and increased to 11.25 amperes over a two-minute period. The initial cell voltage at full current was 3.01 volts. After one day on line, the cell was producing 8.8% caustic at 3.01 volts with a current efficiency of 90.1%. During the next 8 hours, the cell overvoltaged, shutting off the current supply to the cell. The cell could not be restarted.

EXAMPLE 6

A section of expanded PTFE sheeting having an average methanol bubble point of 8.42 psi (ASTM F316-80), an air flow of approximately 4 seconds as measured by Gurley Densometer (ASTM D726-58) and thickness of approximately 3.8 mil was wound onto an aluminum mandrel (19" o.d. and 20" in length). A total of eighteen layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 365° C. for one minute. The EPTFE wound mandrel was then allowed to cool slowly in room temperature air.

The layered EPTFE was cut along the length of the mandrel and removed to form a flat sheet. A section of this layered EPTFE sheet was impregnated with a liquid composition comprising 3.3% perfluoro sulfonic acid polymer (equivalent weight 920 to 950), as in Example 2, 0.4% Triton X-100 non-ionic surfactant (Rohm and Haas), 0.1% Triton CF-54 non-ionic surfactant (Rohm and Haas) and 0.6% tetraethylammonium perfluorooctane sulfonate in ethyl alcohol. The wet layered EPTFE structure was restrained to prevent shrinkage and was allowed to dry at approximately 23° C. overnight and then baked at 100° C. for 7 minutes.

The resulting composite diaphragm was approximately 65 mils thick, had a Gurley air flow of 85 sec. and a permeability of 0.653 reciprocal hours to 0.1% tetraethylammonium perfluorooctane sulfonate in water when measured at 23° C. and at a 20 cm head height differential.

The diaphragm was installed in a laboratory cell while dry and tested as described in Example 2. Water was fed to the anolyte compartment for four hours. The water feed was stopped and membrane quality brine was allowed to flow through the diaphragm over a two-day period without applied current. During four days of operation on membrane quality brine, the cell produced an average of 9.5% caustic at an average cell voltage of 2.95 volts. The average caustic current efficiency was 91.2%, and energy consumption was 2168 kilowatt hours per metric ton of caustic. The anolyte head was steady at about seven centimeters. The brine feed to the cell was then switched to diaphragm quality brine. Over the next twenty days of operation, the cell produced an average of 9.9% caustic at an average of 3.26 volts. The caustic current efficiency averaged 94.9% and the energy consumption was 2304 kilowatt hours per metric ton of caustic during the period operated on this brine. The cell was terminated after a total of 27 days on line. The anolyte head was 62 centimeters when cell operation was terminated.

EXAMPLE 7

A section of expanded PTFE sheeting having an average methanol bubble point of 7.0 psi (ASTM F316-80), an air flow of approximately 4 seconds as measured by Gurley Densometer (ASTM D726-58) and thickness of approximately 4 mils was wound onto an aluminum mandrel (3.5" o.d. and 9" in length). A total of twenty layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 370° for one minute. The EPTFE wound mandrel was then allowed to cool slowly in room temperature air.

The layered EPTFE was cut along the length of the mandrel and removed to form a flat sheet. A section of this layered EPTFE sheet was impregnated with a liquid composition comprising 3.75% perfluoro sulfonic acid polymer (equivalent weight 920 to 950), as in Example 2, 1.2% Triton X-100 non-ionic surfactant (Rohm and Haas) and 0.4% Triton CF-54 non-ionic surfactant (Rohm and Haas) in ethyl alcohol. The wet layered EPTFE structure was restrained to prevent shrinkage and was allowed to dry at approximately 23° C. overnight. The composite was then baked at 80° C. for five minutes.

The EPTFE/perfluoro ion exchange polymer composite was wet with a 0.1% tetraethylammonium perfluorooctane sulfonate solution in water to evaluate liquid permeability.

The resulting composite diaphragm contained 13.7% perfluoro sulfonic acid polymer by weight and had a permeability of 0.565 reciprocal hours to 0.1% tetraethylammonium perfluorooctane sulfonate in water when measured at 23° C. and at a 20 cm head height differential.

The diaphragm was installed in a laboratory cell while wet with the surfactant/water solution and tested as described in Example 2. Membrane quality brine was allowed to flow through the diaphragm overnight without applied current. Over one hundred and twenty-one days of operation on membrane quality brine, the cell produced an average of 10.2% caustic at an average cell voltage of 3.17 volts. The average caustic current efficiency was 95.1% and energy consumption was 2231 kilowatt hours per metric ton of caustic. The anolyte head was steady at about six centimeters. The brine feed was then switched to a batch of brine which was contaminated with particulates. This resulted in partial plugging of the diaphragm; cell operation degenerated and was terminated.

EXAMPLE 8

A section of expanded PTFE sheeting having an average methanol bubble point of 11.8 psi (ASTM F316-80), an air flow of approximately 5.1 seconds as measured by Gurley Densometer (ASTM D726-58) and thickness of approximately 4.4 mils was wound onto an aluminum mandrel (3.5" o.d. and 9" in length). A total of seventeen layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 370° C. for one minute. The EPTFE wound mandrel was then allowed to cool slowly in room temperature air.

The layered EPTFE was cut along the length of the mandrel and removed to form a flat sheet. A section of this layered EPTFE sheet was impregnated with a liquid composition comprising 2.7% perfluoro sulfonic acid polymer (equivalent weight 920 to 950), as in Example 2, 0.9% Triton X-100 non-ionic surfactant (Rohm and Haas) and 0.3% Triton CF-54 non-ionic surfactant (Rohm and Haas) in ethyl alcohol. The wet layered EPTFE structure was restrained to prevent shrinkage and was allowed to dry at approximately 23° C. overnight. The composite was then baked at 100° C. for 5 minutes.

The EPTFE/perfluoro ion exchange polymer composite was wet with a 0.1% tetraethylammonium perfluorooctane sulfonate solution in water to evaluate liquid permeability.

The resulting composite diaphragm contained 6.0% perfluoro sulfonic acid polymer by weight and had a permeability of 0.490 reciprocal hours to 0.1% tetraethylammonium perfluorooctane sulfonate in water when measured at 23° C. and at a 20 cm head height differential.

The sample described above was installed wet in a laboratory cell and tested as described in Example 2. Membrane brine was fed to the anode compartment overnight before current was applied. Over the first 35 days of operation, the cell voltage averaged 2.99 volts, the current efficiency was 95.0% and the caustic concentration was 10.3%. During the next 10 days, problems with the brine feed system caused the caustic concentration to increase to 18.4%, then decrease to 8.8% before the cell was stabilized again. For the next 60 days, the cell voltage averaged 3.10 volts, the current efficiency was 95.1% and caustic concentration was 9.7%. The cell was allowed to operate for a total of 186 days, during the last 85 of which the cell operated at an average cell voltage of 3.10 volts, an average current efficiency of 94.7% and an average caustic concentration of 9.9%. Overall, excluding the ten day caustic excursion, the cell operated at an average of 3.07 volts, 94.9% current efficiency and 9.9% caustic. These results are summarized in Table 3.

TABLE 3

| Days | Caustic wt. % | CE % | Cell Volts | kWh/ MT NaOH | k factor V/(kA/m$^2$) |
|---|---|---|---|---|---|
| 1-35 | 10.3 | 95.0 | 2.99 | 2110 | 0.28 |
| 36-45 | | caustic excursion to 18.4% | | | |
| 46-105 | 9.7 | 95.1 | 3.10 | 2180 | 0.32 |

TABLE 3-continued

| Days | Caustic wt. % | CE % | Cell Volts | kWh/ MT NaOH | k factor V/(kA/m²) |
|---|---|---|---|---|---|
| 105–186 | 9.9 | 94.7 | 3.10 | 2190 | 0.32 |
| Avg. | 9.9 | 94.9 | 3.08 | 2170 | 0.31 |
| | | (excluding caustic excursion) | | | |

TABLE 4

| Days | Caustic wt. % | CE % | Cell Volts | kWh/ MT NaOH | k factor V/(kA/m²) |
|---|---|---|---|---|---|
| 1–2 | 10.2 | 94.0 | 2.99 | 2130 | 0.28 |
| 2–40 | 10.1 | 93.1 | 3.13 | 2350 | 0.33 |
| 41–421 | 9.9 | 94.7 | 3.25 | 2300 | 0.38 |

EXAMPLE 9

A section of expanded PTFE sheeting with an average methanol bubble point of 9.9 psi (ASTM F316-80), an air flow of approximately 6 seconds as measured by Gurley Densometer (ASTM D726-58) and thickness of approximately 4.5 mils was wound onto an aluminum mandrel (19" o.d. and 21" in length). A total of twenty-two layers of EPTFE sheeting were wound onto the mandrel. This sheeting was restrained by placing hose clamps around the circumference of the mandrel at each end. The layers of EPTFE sheeting were bonded together by immersing the wound mandrel in a molten salt bath at 370° C. for one minute. The EPTFE wound mandrel was then allowed to cool slowly in room temperature air.

The layered EPTFE was cut along the length of the mandrel and removed to form a flat sheet. A section of this layered EPTFE sheet was impregnated with a liquid composition comprising 3.3% perfluoro sulfonic acid polymer (equivalent weight 920 to 950), as in Example 2, 0.4% Triton X-100 non-ionic surfactant (Rohm and Haas), 0.1% Triton CF-54 non-ionic surfactant (Rohm and Haas) and 0.6% tetraethylammonium perfluorooctane sulfonate (Mobay) in ethyl alcohol. The wet layered EPTFE structure was restrained to prevent shrinkage and was allowed to dry at approximately 23° C. overnight. The composite was then baked at 100° C. for 7 minutes.

The resulting composite diaphragm was approximately 80 mils thick, had a Gurley air flow of 95 seconds and a permeability of 0.366 reciprocal hours to 0.1% tetraethylammonium perfluorooctane sulfonate in water when measured at 23° C. and at a 20 cm head height differential.

The sample described above was installed dry in a laboratory cell and tested as described in Example 2. The anolyte compartment was filled with water and the water was allowed to flow through the diaphragm for several hours. Membrane quality brine feed was then started and allowed to flow for several hours before the current was applied. Over the first two days of operation, the average cell voltage was 2.99 volts and current efficiency was 94.0% at 10.2% caustic with a 21 centimeter anolyte head. The brine feed was then switched to diaphragm quality brine. Over the next 38 days, there was a steady increase in anode head and voltage. The average cell voltage over this time period was 3.13 volts and current efficiency was 93.1% at 10.1% caustic production and a 32 cm anolyte head. After the head and voltage stabilized, the cell was operated for 381 more days, for a total of 421 days of operation. During this time, it experienced numerous shutdowns, caustic excursions and other upsets. Overall, during these 381 days, the cell produced an average of 9.9% caustic, at an average cell voltage of 3.25 volts, an average current efficiency of 94.7% and an anolyte head of 28 centimeters. These results are summarized in Table 4.

EXAMPLE 10

A section of expanded PTFE sheeting having an average methanol bubble point of 10.5 psi (ASTM F316-80), an air flow of 11 seconds as measured by Gurley Densometer (ASTM D726-58) and a 4.5 mils thickness was wound around an aluminum mandrel (6.0" o.d. and 9" in length). Eight layers of this sheeting were wound onto the mandrel. Then a section of expanded PTFE sheeting with an average methanol bubble point of 7.1 psi (ASTM F316-80), an air flow of 5 seconds as measured by Gurley Densometer (ASTM D726-58) and a thickness of 4 mils was wound on top of it. Seventeen layers of this sheeting were wound over the initial eight layers.

The EPTFE sheeting was restrained by placing hose clamps around the circumference of the mandrel at each end. The layers of EPTFE were bonded together by immersing the wound mandrel in a molten salt bath at 367° C. for one minute. The EPTFE wound mandrel was allowed to cool slowly in room temperature air. The exposed outer surface of the EPTFE which had been derived from the precursor with the lower methanol bubble point is herein designated side A. The reverse side is herein designated as side B.

The layered EPTFE structure was impregnated with a liquid composition of 3.3% perfluoro sulfonic acid polymer (equivalent weight 920 to 950), as in Example 2, 0.4% Triton X-100 non-ionic surfactant (Rohm and Haas), 0.1% Triton CF-54 non-ionic surfactant (Rohm and Haas) and 0.6% tetraethylammonium perfluorooctane sulfonate in ethyl alcohol. The wet EPTFE structure was restrained to prevent shrinkage and was allowed to dry at 23° C. for 16 hours. The restrained EPTFE/perfluoro ion exchange polymer composite was then placed into a 100° C. oven for 7 minutes for final drying.

A strip 0.248 inches wide and 6 cm long and 0.089 inches thick was cut from the dried composite structure (thickness and width figures were each the average of three measurements along the 6 cm length). The strip was weighed and density calculated. A razor incision was then made at one end of the strip in a plane parallel to the surface (i.e., perpendicular to the Z axis or thickness direction). The separation was propagated by peeling one section from the other; the multilayer structure being delaminated at the interface between two discrete precursor layers. The section containing the A side is herein designated section AS. The section containing the B side is herein designated BS. Thickness (the average of three measurements along the 6 cm length) and weight of each section was measured and the density of each section was calculated. Results are shown in Table 5.

TABLE 5

| | Thickness (inches) | Density (gm/cc) |
|---|---|---|
| Composite structure | 0.89 | .350 |
| AS section | 0.42 | .308 |

TABLE 5-continued

| | Thickness (inches) | Density (gm/cc) |
|---|---|---|
| BS section | 0.47 | .388 |

These measurements demonstrate the asymmetry with respect to density and structure which can be achieved by this invention.

A sample of EPTFE/perfluoro ion exchange polymer composite prepared as above was then wet with a solution of 0.1% tetraethylammonium perfluorooctane sulfonate in water to evaluate liquid permeability. Permeability was measured with a 20 cm head of water containing 0.1% tetraethylammonium perfluorooctane sulfonate at 23° C. No measurements were taken until excess surfactant had been flushed from the diaphragm as evidenced by the diaphragm becoming uniformly translucent with no opaque or hazy regions. With the sample oriented in the permeability tester with flow in the direction from the A side, through the diaphragm towards the B side, the permeability measured was 0.20 reciprocal hours.

A sample of the composite described above was installed dry in a laboratory cell with the A side oriented towards the anode. Water was fed to the anode compartment for two hours, then the feed was changed to membrane quality brine which continued overnight before power was applied. The cell was operated for 11 days producing an average of 9.9% caustic. The cell voltage averaged 3.01 volts and the current efficiency was 94.2%, for a total electrical energy consumption of 2140 kilowatt hours per metric ton of caustic. The cell was shut down for maintenance to the laboratory area, and the diaphragm was damaged when the cell was restarted. Results are summarized in Table 6.

TABLE 6

| Days | Caustic wt. % | CE % | Cell Volts | kWh/ MT NaOH | k-factor V/(kA/m$^2$) |
|---|---|---|---|---|---|
| 1-11 | 9.9 | 94.2 | 3.01 | 2140 | 0.28 |

EXAMPLE 11

A section of expanded PTFE sheeting having an average methanol bubble point of 10.5 psi (ASTM F316-80), an air flow of 11 seconds as measured by Gurley Densometer (ASTM D726-58) and a 4.5 mil thickness was wound around an aluminum mandrel (3⅞" o.d. and 9" in length). Nine layers of this sheeting were wound onto the mandrel. Then a section of expanded PTFE sheeting having average methanol bubble point of 6.3 psi (ASTM F316-80), an air flow of 5 seconds as measured by Gurley Densometer (ASTM D726-58), and a thickness of 3.7 mils was wound on top of it. Seventeen layers of this sheeting were wound over the initial nine layers.

The EPTFE sheeting was restrained by placing hose clamps around the circumference of the mandrel at each end. The layers of EPTFE were bonded together by immersing the wound mandrel in a molten salt bath at 364° C. for one minute. The exposed outer surface of the EPTFE which had been derived from the precursor with the lower methanol bubble point is herein designated as side A. The reverse side is herein designated as side B.

The layered EPTFE structure was impregnated with a liquid composition of 3.3% perfluoro sulfonic acid polymer (equivalent weight 920 to 950), as in Example 2, 0.4% Triton X-100 non-ionic surfactant (Rohm and Haas), 0.1% Triton CF-54 non-ionic surfactant (Rohm and Haas) and 0.6% tetraethylammonium perfluorooctane sulfonate in ethyl alcohol. The wet EPTFE structure was restrained to prevent shrinkage and was allowed to dry at 23° C. for 16 hours. The restrained EPTFE/perfluoro ion exchange polymer was then placed into a 100° C. oven for 7 minutes for final drying.

A strip 0.249 inches wide and 6 cm long and 0.071 inches thick was cut from the dried composite structure. Thickness and width figures were each the average of three measurements along the 6 cm length. The strip was weighed and density calculated. A razor incision was then made at one end of the strip in a plane parallel to the surface (i.e., perpendicular to the Z axis or thickness direction). The separation was propagated by peeling one section from the other, the multilayer structure being delaminated at the interface between the two discrete precursor layers. The section containing the A side is herein designated section AS. The section containing the B side is herein designated section BS. Thickness (the average of three measurements along the 6 cm length) and weight of each section was measured and the density of each section calculated. Results are shown in Table 7.

TABLE 7

| | Thickness (inches) | Density (gm/cc) |
|---|---|---|
| Composite structure | .071 | .403 |
| AS section | .024 | .346 |
| BS section | .047 | .433 |

The composite laminate as described was installed dry in a laboratory cell with the A side oriented towards the anode. Deionized water was slowly fed into the anolyte compartment until the cell was filled, and then was allowed to flow through the diaphragm for two more hours. The deionized water feed was stopped and membrane quality brine feed was started to the cell overnight before current was applied. After one day of operation, the cell voltage was 3.20 volts, declining to 3.12 volts on the second day. Over the first nine days of operation, the average cell voltage was 3.13 volts and average current efficiency was 96.7% at 10.2% caustic. The average electrical energy consumption during this period was 2170 kilowatt hours per metric ton of caustic produced. Between the eleventh and twelfth days on line, the brine feed stopped due to a salt blockage, and the cell ran without feed for an undetermined amount of time. After the brine feed was restarted and the cell was allowed to equilibrate overnight, the cell voltage was 3.20 volts. Over the next seven days, the voltage slowly decreased to 3.11 volts. Overall, from days thirteen to twenty, the cell produced an average of 10.1% caustic with an average cell voltage of 3.14 volts and an average current efficiency of 96.2%. This corresponds to an electrical energy consumption of 2190 kilowatt hours per metric ton caustic. Results are summarized in Table 8.

TABLE 8

| Days | Caustic wt. % | CE % | Cell Volts | kWh/ MT NaOH | k factor V/(kA/m$^2$) |
|---|---|---|---|---|---|
| 1-9 | 10.2 | 96.7 | 3.13 | 2170 | 0.33 |
| Brine feed blockage: high caustic production | | | | | |
| 13-27 | 10.0 | 96.5 | 3.14 | 2180 | 0.34 |

EXAMPLE 12

A section of expanded PTFE sheeting having an average methanol bubble point of 10.3 psi (ASTM F316-80), an air flow of 6 seconds as measured by Gurley Densometer (ASTM D726-58) and a 2.9 mil thickness was wound around an aluminum mandrel (3.5" o.d. and 9" in length). Eleven layers of this sheeting were wound onto the mandrel. Then a long section of expanded PTFE sheeting with an average methanol bubble point of 6.3 psi (ASTM F316-80), an air flow of 5 seconds as measured by Gurley Densometer (ASTM D726-58), and a thickness of 3.7 mils was wound on top of it. Fifteen layers of this sheeting were wound over the initial eleven layers.

The EPTFE sheeting was restrained by placing hose clamps around the circumference of the mandrel at each end. The layers of EPTFE were bonded together by immersing the wound mandrel in a molten salt bath at 370° C. for one minute. The EPTFE wound mandrel was allowed to cool slowly in room temperature air. The exposed outer surface of the EPTFE which had been derived from the precursor with the lower methanol bubble point is herein designated as side A. The reverse side is herein designated as side B.

The layered EPTFE structure was impregnated with a liquid composition of 3.2% perfluoro sulfonic polymer (equivalent weight 920 to 950), as in Example 2, 0.75% Triton X-100 non-ionic surfactant (Rohm and Haas), 0.25% Triton CF-54 non-ionic surfactant (Rohm and Haas) and 1% tetraethylammonium perfluorooctane sulfonate in ethyl alcohol. The wet EPTFE structure was restrained to prevent shrinkage and was allowed to dry at 23° C. for 16 hours. The restrained EPTFE/perfluoro ion exchange polymer composite was then placed into a 100° C. oven for 7 minutes as a final treatment. The dried structure was 68 mils in thickness.

The EPTFE/perfluoro ion exchange polymer composite was wet with a solution of 0.1% tetraethylammonium perfluorooctane sulfonate in water to evaluate liquid permeability. Permeability was measured with a 20 cm head of water containing 0.1% tetraethylammonium perfluorooctane sulfonate at 23° C. No measurements were taken until excess surfactant had been flushed from the diaphragm as evidenced by the diaphragm becoming uniformly translucent with no opaque or hazy regions; this required about 1 hour. With the sample oriented in the permeability tester with flow in the direction from A side through the diaphragm towards the B side, the permeability measured was 0.42 reciprocal hours.

The sample as described above was installed wet in a laboratory cell with the A side oriented towards the anode. Membrane quality brine was fed to the anode compartment for 70 minutes before current was applied. Over the first two days of operation, the diaphragm performed with a cell voltage of 3.12 volts and a current efficiency of 91.8% at 9.9% caustic. The brine feed was then changed to diaphragm quality brine, and the cell operated for 3 days before it was shut down for several hours for cell room repairs. The cell was restarted and allowed to operate for 27 more days, for a total of 30 days on diaphragm quality brine. Over this time, the average cell voltage was 3.31 volts and the current efficiency was 93.6% while producing an average of 10.1% caustic. The average electrical energy consumption was 2370 kilowatt hours per metric ton of caustic.

At the end of these 32 days, the anolyte head was 29 centimeters. The cell failed due to electrical problems at 35 days on line, and the diaphragm was damaged when restart was attempted. The results are summarized in Table 9.

TABLE 9

| Days | Caustic wt. % | CE % | Cell Volts | kWh/MT NaOH | k factor V/(kA/m$^2$) |
| --- | --- | --- | --- | --- | --- |
| 1–2 | 9.9 | 91.8 | 3.12 | 2280 | 0.33 |
| 3–32 | 10.1 | 93.6 | 3.31 | 2370 | 0.40 |

EXAMPLE 13

A section of expanded PTFE sheeting with an average methanol bubble point of 11.8 psi (ASTM F316-80), an air flow of 5.1 seconds as measured by Gurley Densometer (ASTM D726-58) and a 4.4 mil thickness was wound around an aluminum mandrel (3.5" o.d. and 9" in length). Eleven layers of this sheeting were wound onto the mandrel.

The EPTFE sheeting was restrained by placing hose clamps around the circumference of the mandrel at each end. The layers of EPTFE were bonded together by immersing the wound mandrel in a molten salt bath at 370° C. for one minute. The EPTFE wound mandrel was allowed to cool slowly in room temperature air.

The layered EPTFE structure was impregnated with a liquid composition of 3.2% perfluoro sulfonic acid (equivalent weight 920 to 950), as in Example 2, 1.2% Triton X-100 non-ionic surfactant (Rohm and Haas) and 0.4% Triton CF-54 non-ionic surfactant (Rohm and Haas) in ethyl alcohol. The wet EPTFE structure was restrained to prevent shrinkage and was allowed to dry at 23° C. for 16 hours. The restrained EPTFE/perfluoro ion exchange polymer composite was then placed in a 100° C. oven for five minutes as final treatment.

A 1.4% solution of perfluorocarboxyl ester polymer in 1,1,2-trichloro-1,2,2-trifluoroethane (Freon TF®, DuPont) was applied to one side of the restrained EPTFE/perfluoro ion exchange polymer composite and the composite was allowed to dry at room temperature for one hour. The perfluorocarboxyl ester used was a copolymer of tetrafluoroethylene and

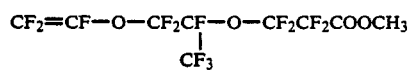

with an equivalent weight in the free acid form of approximately 650 to 750. The treated side is herein designated side C. The composite was wet with a 36% potassium hydroxide solution in a mixture of 85% water and 15% isopropanol and allowed to reside in this solution for 16 hours at room temperature to hydrolyze the perfluoro carboxyl ester polymer to the potassium ion form of the perfluorocarboxylate polymer. The impregnated structure was then immersed in a bath of 0.1% tetraethylammonium perfluorooctane sulfonate in water for one hour to dilute and largely replace residual potassium hydroxide solution in the pores. The resultant composite (on a dry basis) contained about 9% perfluorosulfonic acid polymer and about 0.9% perfluorocarboxylic acid polymer, the latter being largely concentrated on side C. Permeability was then measured with a 20 cm head of water containing 0.1% tetraethylammonium perfluorooctane sulfonate at 23° C. No measurements were taken until excess surfactant had been flushed from the diaphragm as evidenced by the diaphragm becoming uniformly translucent with no opaque or hazy regions. The permeability measured was 0.23 reciprocal hours.

The diaphragm was installed in a laboratory cell while wet with the surfactant/water solution from the permeability apparatus with the side designated side C oriented towards the cathode. Membrane quality brine was allowed to flow through the diaphragm overnight without applied current. The current was started and increased to 11.25 amperes over a ten-minute period. The initial cell voltage at full current was 2.91 volts. Over seventeen days on load, the cell produced an average of 10.0% caustic at an average cell voltage of 2.97 volts. The average caustic current efficiency was 91.5% and electrical energy consumption was 2176 kilowatt hours per metric ton of caustic. The anolyte head was steady at about 12 centimeters.

EXAMPLE 14

A section of expanded PTFE sheeting having an average methanol bubble point of 8.4 psi (ASTM F316-80), an air flow of 4 seconds as measured by Gurley Densometer (ASTM D726-58) and a 3.8 mil thickness was wound around an aluminum mandrel (3.5" o.d. and 9" in length). Five layers of this sheeting were wound onto the mandrel. Then a section of expanded PTFE sheeting with an average methanol bubble point of 26.0 psi (ASTM F316-80), an air flow of 3.5 seconds as measured by Gurley Densometer (ASTM D726-58) and a thickness of 1.1 mils was wound around the first sheeting. Four layers of this second sheeting were wound over the initial five layers.

EPTFE sheeting was restrained by placing hose clamps around the circumference of the mandrel at each end. The layers of EPTFE were bonded together by immersing the wound mandrel in a molten salt bath at 365° C. for one minute. The EPTFE wound mandrel was allowed to cool slowly in room temperature air. The exposed outer surface of the EPTFE which had been derived from the precursor with the higher methanol bubble point is herein designated side A.

The layered EPTFE structure was impregnated with a liquid composition of 3.3% perfluoro sulfonic acid polymer (equivalent weight 920 to 950), 0.4% Triton X-100 non-ionic surfactant (Rohm and Haas), 0.1% Triton CF-54 non-ionic surfactant (Rohm and Haas) and 0.6% tetraethylammonium perfluorooctane sulfonate in ethyl alcohol. The wet EPTFE structure was restrained to prevent shrinkage and was allowed to dry at 23° C. for 16 hours. The restrained EPTFE/perfluoro ion exchange polymer composite was then placed into a 100° C. oven for 7 minutes for final drying.

The resulting composite was approximately 17 mil thick, had a Gurley air flow of 56 seconds and a density of 0.322 g/cc.

A 2-inch diameter disk of the composite was placed in a filter holder on a vacuum flask and connected to a vacuum pump. The composite disk was installed so that the A side faced the high pressure side. A 1% suspension of fumed silica in deionized water was directed to the A side of the composite and the vacuum pump turned on.

Approximately 25 milliliters of the 1% fumed silica suspension was filtered. The filtrate appeared clear and free of turbidity. A single drop of filtrate was placed on a clean glass slide and dried. Similarly, a single drop of the 1% suspension was placed on a clean glass slide and dried. Both of these samples were examined under high magnification (100,000×) using a scanning electron microscope. The fumed silica suspension specimen showed very small spherical particles, approximately 200 Angstroms in diameter, and agglomerates of these particles. The filtrate specimen was virtually free of the fumed silica particles. This demonstrates that this composite is a very effective filter for even very small particles.

EXAMPLE 15

A section of expanded PTFE sheeting having an average methanol bubble point of 25 psi (ASTM F316-80), an air flow of 13.4 seconds as measured by Gurley densometer (ASTM D726-58) and a thickness of 1.5 mils was wound onto a stainless steel mandrel (14.0" o.d. and 40.0" in length). Twenty layers of this sheeting were wound onto the mandrel. Then a section of expanded PTFE sheeting having an average methanol bubble point of 16.5 psi (ASTM F316-80) an air flow of 13.5 sec. as measured by Gurley densometer (ASTM D726-58) and a thickness of 4.8 mils was wound on top of the previous layers. Twenty-nine layers of this second type of sheeting were wound over the initial twenty layers.

The EPTFE sheeting was restrained by placing hose clamps around the circumference of the mandrel at each end. The layers of EPTFE were bonded together by immersing the wound mandrel in a molten salt bath at 370° C. for two minutes. The EPTFE wound mandrel was allowed to cool slowly in room temperature air. Then the cylindrical tube was cut longitudinally and removed from the mandrel to form a flat sheet. The exposed outer surface of the EPTFE which had been derived from the presursor with the lower methanol bubble point is herein designated side A. The reverse side is herein designated as side B.

The layered EPTFE structure was restrained in a frame and placed in a vacuum chamber with side B facing up. Vacuum was drawn in the chamber to 125 mm Hg, absolute pressure. While maintaining vacuum, a liquid composition of 3.3% perfluorosulfonic acid polymer (equivalent weight 600–700, extracted from 900–950 EW polymer using $CF_2ClCFCl_2$ at reflux), 1.5% Triton X-100 non-ionic surfactant (Rohm & Haas), 0.5% Triton CF-54 non-ionic surfactant (Rohm & Haas) and 10% 1-methoxy-2-propanol in ethyl alcohol was introduced to the B side of the EPTFE sheet. The liquid composition was allowed to fully wet the layered EPTFE sheeting while under 125 mm Hg, absolute pressure vacuum. After impregnation the vacuum was released, excess liquid composition was removed from the EPTFE structure surface and the structure was allowed to dry (A side down) for 16 hours at 23° C. The restrained EPTFE/perfluoro ion exchange polymer composite was then placed into a 100° C. oven for 7 minutes for final drying.

The resulting composite diaphragm was approximately 121 mils in thickness, had a Gurley air flow of 612 sec. and a specific gravity of 0.61.

The diaphragm was installed in a laboratory cell while dry and tested as described in Example 2, with side B oriented toward the cathode. Water was fed to the anolyte compartment for 16 hours. The water feed was stopped and membrane quality brine was allowed to flow through the diaphragm for 5 to 6 hours before current was applied. During 56 days of operation on membrane quality brine at 85° C. and 2.5 kA/m², the cell produced an average of 10.0% caustic at an average cell voltage of 3.10 volts. This corresponds to a k-factor of 0.32 Vm²/kA. The average caustic current efficiency was 95.2%, and energy consumption was 2182 kilowatt hours per metric ton of caustic. The anolyte head was steady at about 23 centimeters. Repeats of this example gave essentially identical results.

Comparison of Cell Performance Between Conventional Diaphragms and the Present Invention diaphragm production of chlorine and caustic is typically carried out using a slurry-deposited diaphragm made of asbestos fiber or resin bonded asbestos fiber (modified asbestos). This type of asbestos diaphragm has been used in the industry for a number of years. Cell performance of a typical modified asbestos diaphragm is given by Donald L. Caldwell on page 140 of Chapter 2 of "Comprehensive Treatise of Electrochemistry, Volume 2: Electrochemical Processing", edited by Bockris, Conway, Yeager and White, Plenum Press, New York and London, 1981. Summarizing Caldwell's data at current densities at or around 2 kA/m², current efficiencies ranged from 95.4% to 97.8% and k factors ranged from 0.48 to 0.63 Vm²/kA for different commercial cells. For operation at 2.5 kA/m² as in our examples, the cell voltages could be expected to be between about 3.50 and 3.87 volts, resulting in power consumption values ranging from 2440 to 2700 kilowatt hours per metric ton of caustic. These data were taken from cells using a version of resin bonded asbestos diaphragms.

The diaphragm of the present invention has exhibited better cell performance than modified asbestos diaphragms. Conservative estimates of cell performance of this diaphragm give about 95% current efficiency, a k factor of 0.32 to 0.34 Vm²/kA and a cell voltage of 3.13 volts at a current density of 2.5 kA/m², all equating to a power consumption of 2208 killowatt hours per metric ton of NaOH, an improvement in power consumption of between 9% and 18% from the range quoted above.

Because the asbestos is a fiber made of $Mg(OH)_2$ and $SiO_2$, it is partially soluble in brine depending on pH and is considered a "living" diaphragm.

Caldwell discusses this "living" feature or asbestos diaphragms in the following excerpt:

"Chrysotile asbestos is not chemically stable in chlorine cell electrolytes $Mg(OH)_2$ is soluble in acid solutions and stable in basic solutions; the reverse is true for $SiO_2$. When a cell is energized, a chrysotile diaphragm will become $SiO_2$ enriched on its acidic, anolyte face, and $Mg(OH)_2$ enriched on its alkaline, catholyte face. The flow through the diaphragm will flush $Mg^{2+}$ ions from the anolyte side toward the catholyte, where they will reprecipitate as $Mg(OH)_2$. This precipitate will constrict the flow channels, decreasing flow rate and efficiency and increasing voltage drop and caustic strength. The diaphragm is said to "tighten". After a period in service, the diaphragm reaches a state of equilibrium with its surroundings and its characteristics stabilize. However, any drastic change in operating conditions will cause the dissolution-reprecipitation process to begin anew".

It is important to note that with each fluctuation in operating conditions, some portion of the diaphragm is resolubilized and lost. This leads to degradation of the diaphragm and eventual loss of performance.

Even with constant operation, the diaphragm is slowly eroded or dissolved so that a steady decrease in current efficiency can be expected.

The diaphragm of this invention is made of chemically stable materials and so is insensitive to pH changes, unlike the asbestos diaphragm. This pH stability allows the diaphragm of this invention to operate under conditions in which electrical upsets occur and in which the current fluctuates without significant loss of performance. This enables a plant to take advantage of power price breaks at off-peak times (load shedding) and prevents permanent loss of performance due to electrical outages. Further, this stability allows cell operators to perform chemical treatments to this diaphragm to regenerate performance. All of these treatments or changes would be detrimental to an asbestos diaphragm's performance. Example 2 demonstrates the stability of performance of the present invention. Over the course of 421 days of operation, which were plagued with numerous electrical upsets the current efficiency remained relatively constant. Examples 8 and 11 also illustrate the stability of performance and resiliency of the present invention. An asbestos diaphragm, even under the best of operating conditions, would have shown a steady decline in current efficiency over this same period of time.

Moreover, an asbestos diaphragm would not have survived the electrical upsets experienced by these examples of the present invention.

For the layered PTFE diaphragm of U.S. Pat. No. 3,944,477, the best example of the reference (Example 11) gave a power consumption of 2770 kilowatt hours per metric ton of NaOH, surprisingly 25% worse than the typical 2208 kilowatt hours per metric ton of NaOH of the present invention, even though the present invention used a 16% higher current density, which should increase power consumption.

While the invention has been disclosed herein connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A multilayer, porous, composite, shaped article comprising multiple layers of porous, expanded polytetrafluoroethylene (EPTFE) bonded together, said composite, shaped article having at least a portion of its exterior surfaces and at least a portion of its interior pore surfaces coated with a perfluoro ion exchange polymer, said porous, shaped article having open, continuous channels therethrough which permit flow of fluids through said article.

2. The composite article of claim 1 having substantially all of its exterior surfaces and substantially all of its interior pores coated with a perfluoro ion exchange resin.

3. The composite article of claim 1 containing a water soluble surfactant within its pores.

4. The composite article of claim 1 having a permeability to water containing 0.1% tetra ethyl ammonium perfluorooctane sulfonate between about 0.01 and about 3.0 reciprocal hours at 23° C. under a 20 cm head of water.

5. The composite article of claim 1 in which the perfluoro ion exchange polymer has a ratio of tetrafluoroethylene to functional comonomer of 1.5:1 to 5.6:1.

6. The composite article of claim 1 in which the perfluoro ion exchange polymer is a perfluorosulfonic acid polymer of equivalent weight less than 1000.

7. The composite article of claim 1 in which the perfluoro ion exchange polymer is a perfluorocarboxylic acid polymer of equivalent weight less than 1000.

8. The composite article of claim 1 in which the perfluoro ion exchange polymer is a mixture of perfluorosulfonic acid polymer and perfluorocarboxylic acid polymer of equivalent weight less than 1000.

9. The composite article of claim 1 in which the perfluoro ion exchange polymer is a copolymer containing perfluorosulfonic acid and perfluorocarboxylic acid groups, with an equivalent weight less than 1000.

10. The composite article of claim 1 in which the percentage by weight of perfluoro ion exchange polymer in the composite exceeds 2%.

11. The composite article of claim 1 in the form of a tube.

12. The composite tube of claim 11 having a wall thickness exceeding 250 micrometers.

13. The composite article of claim 1 in the form of a sheet.

14. The composite sheet of claim 13 having a thickness exceeding 0.25 millimeters.

15. The composite sheet of claim 14 having a thickness between about 0.76 millimeters and about 5.0 millimeters.

16. The composite article of claim 1 having a specific gravity between 0.05 and about 1.1.

17. The composite article of claim 16 having a specific gravity between about 0.15 and about 0.7.

18. The composite article of claim 1 having an asymmetric fine structure, wherein at least two of said multiple layers have different microporous structures.

19. The composite article of claim 18 wherein said at least two layers have methanol bubble point values which differ by at least 10%.

20. The composite article of claim 18 wherein said at least two layers have specific gravities which differ by at least 10%.

21. The composite article of claim 18 wherein said at least two layers have specific gravities which differ by at least 5%.

22. The composite article of claim 21 in the form of a tube and in which said at least two layers are oriented such that the layer having higher specific gravity is inside the layer having lower specific gravity.

23. The composite article of claim 21 in the form of a tube and in which said at least two layers are oriented such that the layer having higher specific gravity is outside the layer having lower specific gravity.

* * * * *